(12) United States Patent
Jeon et al.

(10) Patent No.: US 7,483,364 B2
(45) Date of Patent: Jan. 27, 2009

(54) METHOD AND APPARATUS FOR DETECTING STBC-OFDM SIGNALS IN TIME-VARIANT CHANNELS

(75) Inventors: Won Gi Jeon, Pyungtaek (KR); Jeong Wook Seo, Pyungtaek (KR); Jung Wook Wee, Namyangju (KR); Ki Won Kwon, Seoul (KR); Jong Ho Paik, Suwon (KR); Dong Sun Kim, Incheon (KR)

(73) Assignee: Korea Electronics Technology Institute (KR)

( * ) Notice: Subject to any disclaimer, the term of this patent is extended or adjusted under 35 U.S.C. 154(b) by 721 days.

(21) Appl. No.: 11/123,084

(22) Filed: May 6, 2005

(65) Prior Publication Data

US 2005/0249111 A1 Nov. 10, 2005

(30) Foreign Application Priority Data

May 7, 2004 (KR) .................. 10-2004-032299

(51) Int. Cl.
*H04J 11/00* (2006.01)

(52) U.S. Cl. ........................................... 370/203
(58) Field of Classification Search ................ 370/203, 370/208–210, 464; 709/230–234
See application file for complete search history.

(56) References Cited

U.S. PATENT DOCUMENTS

| | | | |
|---|---|---|---|
| 6,834,043 B1 | 12/2004 | Vook et al. | |
| 6,865,237 B1* | 3/2005 | Boariu et al. | 375/295 |
| 2003/0072395 A1* | 4/2003 | Jia et al. | 375/341 |
| 2004/0013180 A1* | 1/2004 | Giannakis et al. | 375/219 |
| 2004/0072594 A1 | 4/2004 | Hwang et al. | |
| 2004/0120274 A1* | 6/2004 | Petre et al. | 370/320 |
| 2004/0131041 A1* | 7/2004 | Tirkkonen et al. | 370/349 |
| 2004/0208254 A1 | 10/2004 | Lee et al. | |
| 2005/0047517 A1* | 3/2005 | Georgios et al. | 375/267 |

OTHER PUBLICATIONS

Won Gi Jeon, Kyung Hi Chang, Yong Soo Cho, "An Equalization Technique for Orthogonal Frequency-Division Multiplexing Systems in Time-Variant Multipath Channels," IEEE Transactions on Communications, vol. 47, No. 1, Jan. 1999, pp. 27-32.

Leonard J. Cimini, Jr., "Analysis and Simulation of a Digital Mobile Channel Using Orthogonal Frequency Division Multiplexing," IEEE Transactions on Communications, vol. Com-33, No. 7, Jul. 1985, pp. 665-675.

(Continued)

*Primary Examiner*—Dmitry Levitan
(74) *Attorney, Agent, or Firm*—Edell, Shapiro & Finnan, LLC (57) ABSTRACT

The present invention relates to a method and apparatus for detecting STBC-OFDM signals in time-variant channels. The method includes a step of demodulating STBC-OFDM modulation signals into OFDM reception symbols using Fast Fourier Transform (FFT); a step of estimating a frequency response for each sub-channel; an STBC decoding step of calculating decision variables determining the A transmit data symbols that are transmitted during the B OFDM symbol periods for each sub-channel; and a step of determining the transmit data symbols based on the decision variables calculated at the STBC decoding step. In this case, the decision variables are calculated using a linear equation that allows a squared Euclidean distance from OFDM reception symbols, which are demodulated during the B symbol periods, to have a local minimum for each decision variable when the STBC encoding and the frequency responses estimated during the B OFDM symbol periods are applied.

17 Claims, 5 Drawing Sheets

OTHER PUBLICATIONS

Vahid Tarokh, Hamid Jafarkhani, A. R. Calderbank, "Space-Time Block Codes from Orthogonal Designs," IEEE Transactions on Information Theory, vol. 45, No. 5, Jul. 1999, pp. 1456-1467.

Siavash M. Alamouti, "A Simple Transmit Diversity Technique for Wireless Communications," IEEE Journal on Select Areas in Communications, vol. 16, No. 8, Oct. 1998, pp. 1451-1458.

* cited by examiner

Fig. 1

PRIOR ART

Fig. 2

PRIOR ART

Fig. 3

PRIOR ART

METHOD AND APPARATUS FOR DETECTING STBC-OFDM SIGNALS IN TIME-VARIANT CHANNELS

RELATED APPLICATIONS

The present disclosure relates to subject matter contained in priority Korean Application No. 10-2004-032299, filed on 7 May 2004, which is herein expressly incorporated by reference in its entirety.

BACKGROUND OF THE INVENTION

1. Field of the Invention

The present invention relates generally to space-time block coded orthogonal frequency division multiplexing and, more particularly, to a method and apparatus for detecting space-time block coded orthogonal frequency division multiplexing signals in time-variant channels.

2. Description of the Related Art

Recently, in order to cope with fading distortion due to a multi-path channel at the time of transmitting wireless wideband signals, research into space diversity techniques of improving link fading margin performance using a plurality of antennas at the transmitting and receiving ends of an Orthogonal Frequency Division Multiplexing (OFDM) system has been conducted.

A representative of space-time diversity techniques that are implemented at a transmitting end is Space-Time Block Coding (STBC). STBC was initially proposed as a transmit antenna diversity coding technique using two transmit antennas by Alamouti [see S. M. Alamouti, "A Simple Transmit Diversity Technique for Wireless Communications", *IEEE J. Select. Areas Comm.*, Vol. 16, No. 8, October, 1998; hereinafter referred to as "Reference 1"]. Thereafter, the transmit diversity coding technique could be expanded to cases involving an arbitrary number of transmit antennas based on an orthogonal design condition by Tarokh [see V. Tarokh, H. Jafarkhani, and A. R. Calderbank, "Space-Time Block Codes From Orthogonal Designs," *IEEE Trans. Inform. Theory*, Vol. 45, No. 5, July, 1999; hereinafter referred to as "Reference 2"].

Meanwhile, in an STBC-OFDM system, an STBC encoder is independently applied to N sub-carriers corresponding to sub-channels that experience flat fading. At this time, the encoding method is determined according to the number of transmit antennas.

Figure 1:
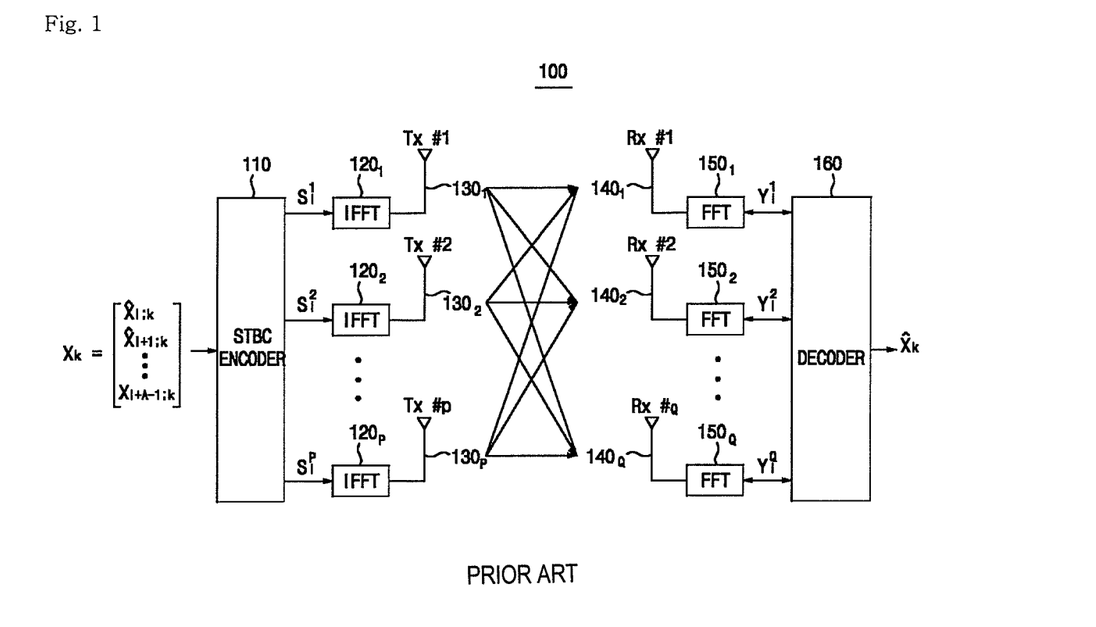
FIG. 1 is a block diagram illustrating a conventional STBC-OFDM communication system having P transmit antennas and Q receive antennas.

FIG. 1 is a schematic block diagram of a conventional STBC-OFDM communication system 100 having P transmit antennas and Q receive antennas.

Referring to FIG. 1, a data symbol vector $X_k=[X_{0;k}, \ldots, X_{A-1;k}]^T$ taken from input data stream is encoded into a coded data symbol vector $S_k^i=[S_{0;k}^i, \ldots, S_{B-1;k}^i]^T$ (i=1, 2, . . . , P) during B OFDM symbol periods by an STBC encoder 110. Here, k denotes a subcarrier index. The STBC-encoded data symbols are modulated by Inverse Fast Fourier Transforms (IFFTs) $120_1, 120_2, \ldots, 120_P$ corresponding to each transmit antennas $130_1, 130_2, \ldots, 130_P$, and are then transmitted through corresponding transmit antennas.

The transmitted OFDM signals are received by the Q receive antennas $140_1, 140_2, \ldots, 140_Q$, and are then demodulated into $Y_i^j$ (j=1, 2, . . . , Q) by Fast Fourier Transforms (FFTs) $150_1, 150_2, \ldots, 150_Q$ corresponding to each of the receive antennas. The demodulated OFDM symbols are decoded by a decoder 160, thus determining transmitted data symbols.

The construction of the transmitter and the receiver in the STBC-OFDM communication system is described in detail with reference to FIGS. 2 and 3. Meanwhile, for convenience of understanding, the most basic configuration, i.e., a system having two transmit antennas and one receive antenna, is described. Systems having three or more transmit antennas and two or more receive antennas can be easily understood from the disclosure of the present invention.

Figure 2:
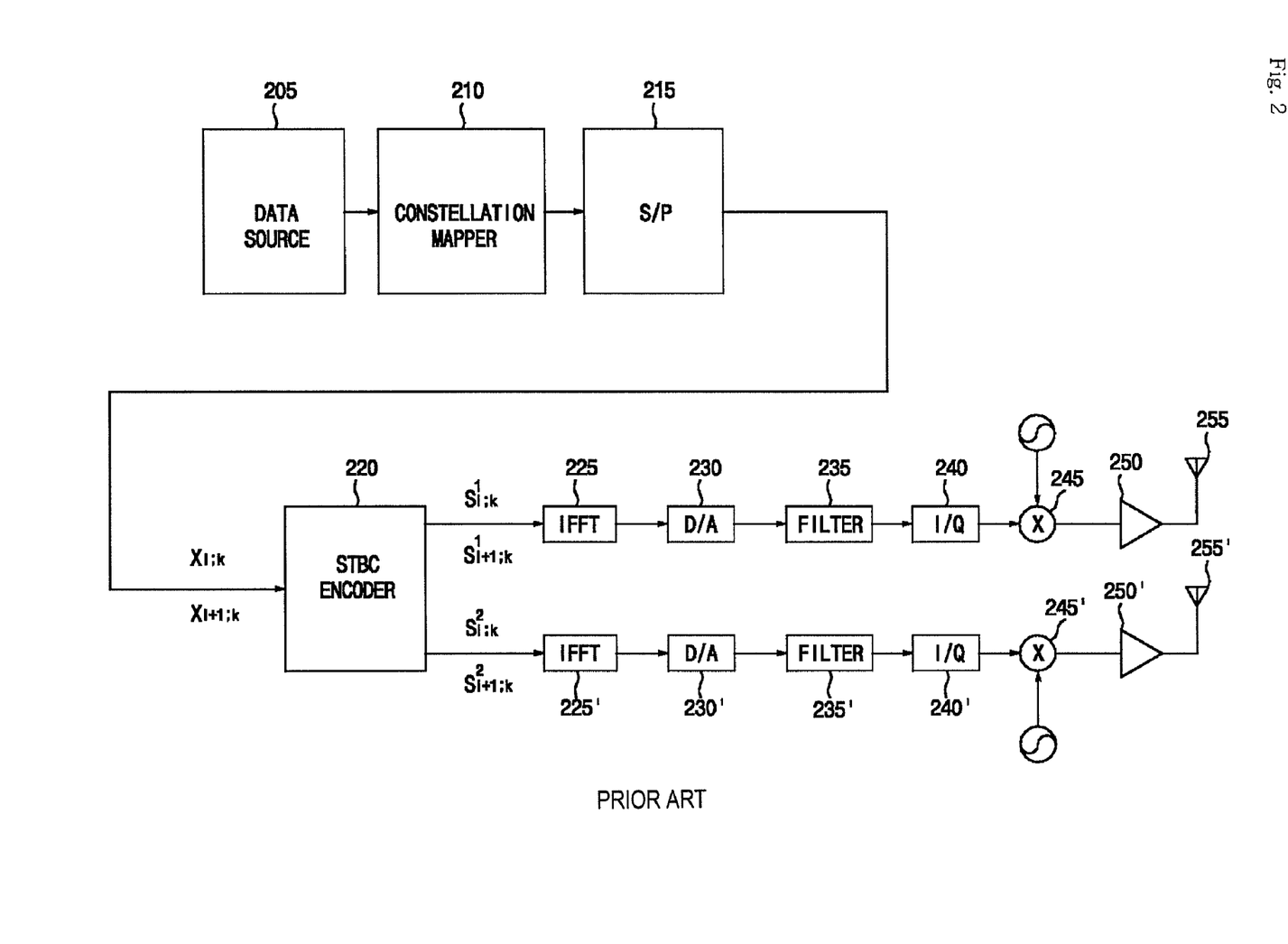
FIG. 2 is a schematic diagram of an STBC-OFDM transmitter having two transmit antennas.

FIG. 2 shows a schematic construction of an STBC-OFDM transmitter that implements STBC transmit diversity using two transmit antennas.

Referring to FIG. 2, an STBC-OFDM transmitter 200 includes a data source 205, a constellation mapper 210, a Serial-to-Parallel (S/P) converter 215, an STBC encoder 220, Inverse Fast Fourier Transformers (IFFTs) 225 and 225', Digital-to-Analog (D/A) converters 230 and 230', filters 235 and 235', I/Q modulators 240 and 240', up converters 245 and 245' that convert frequency bands into Radio Frequency (RF) bands, amplifiers 250 and 250', and transmit antennas 255 and 255'.

Data bits from the data source 205 are encoded into M-ary data symbols by the constellation mapper 210. The data symbols pass through an interleaver (not shown), are converted into parallel data symbols by the S/P converter 215, and are then input to the STBC encoder 220.

In the OFDM system using N sub-carriers, the vector of each input data symbol for a kth (k∈[0, 1, . . . , N−1]) sub-carrier can be defined as follows:

$$X_k = [X_{0;k}, X_{1;k}]^T \tag{1}$$

where $X_k$ is an M-ary data symbol having independent, identically distributed (i.i.d.) characteristics and $(.)^T$ is the transpose of a matrix.

The STBC encoder 220 receives the data symbol vector $X_k=[X_{0;k}, X_{1;k}]^T$ and generates a coded data symbol matrix $S_k$, which fulfill the above-described orthogonal design condition of Tarokh, to the plurality of the transmit antennas.

In the case of an STBC-OFDM communication system having a general code rate, for the kth sub-carrier, a data symbol vector $X_k$ composed of A transmit data symbols passes through the STBC encoder, thus producing a two-dimensional data symbol matrix $S_k$ having a B×P order, which corresponds to B OFDM symbol periods and P spaces, according to a predetermined code rate. Meanwhile, the STBC encoding method according to the predetermined code rate is known to those skilled in the art.

Accordingly, for convenience of description, for example, in the case where two transmit antennas (i=1, 2) are used, and a data symbol matrix $S_k$ having a 2×2 order is produced by encoding two transmit data symbols, the data symbol vector $S_k$ output from the STBC encoder can be expressed as the following Equation 2.

$$S_k = \begin{bmatrix} S_{0;k}^1 & S_{0;k}^2 \\ S_{1;k}^1 & S_{1;k}^2 \end{bmatrix} = \begin{bmatrix} X_{0;k} & X_{1;k} \\ -X_{1;k}^* & X_{0;k}^* \end{bmatrix} \tag{2}$$

where the first and second columns of $S_k$ represent data symbols for first and second transmit antennas, respectively. The first and second rows of $S_k$ represent data symbols for first and second OFDM symbol periods, respectively. Also, $(.)^*$ represents a complex conjugate.

Furthermore, the coded data symbol matrix $S_k$ encoded by the STBC encoder can be expressed as the following Equation 3 for N sub-channels.

$$S_l^i = [S_{l;0}^i, S_{l;1}^i, \ldots, S_{l;N-1}^i]^T \quad (3)$$

where l=0 and 1, which represent first and second OFDM symbol periods antennas, respectively.

The data symbol $S_{l;k}^i$ encoded by the STBC encoder 220 is modulated into a base band by the IFFT 225. At this time, a guard interval longer than the period of the maximum delay spread of a channel is inserted between successive OFDM symbols in order to prevent Inter-Symbol Interference (ISI) due to a multi-path channel. Generally, a Cyclic Prefix (CP) is used as the guard interval so as to prevent the destruction of orthogonality that may occur due to the delay of sub-carriers. The signal is then transmitted to a wireless channel through the D/A Converters 230 and 230', the filters 235 and 235', the I/Q modulators 240 and 240', the up converters 245 and 245', the amplifiers 250 and 250', and the antennas 255 and 255'.

For the more detailed construction of the STBC-OFDM transmitter, refer to "Analysis and Simulation of a Digital Mobile Channel Using Orthogonal Frequency-Division Multiplexing" (L. J. Cimini, Jr., *IEEE Trans. Commu.*, Vol. 33, No. 7, July, 1985; hereinafter referred to as "Reference 3").

Figure 3:
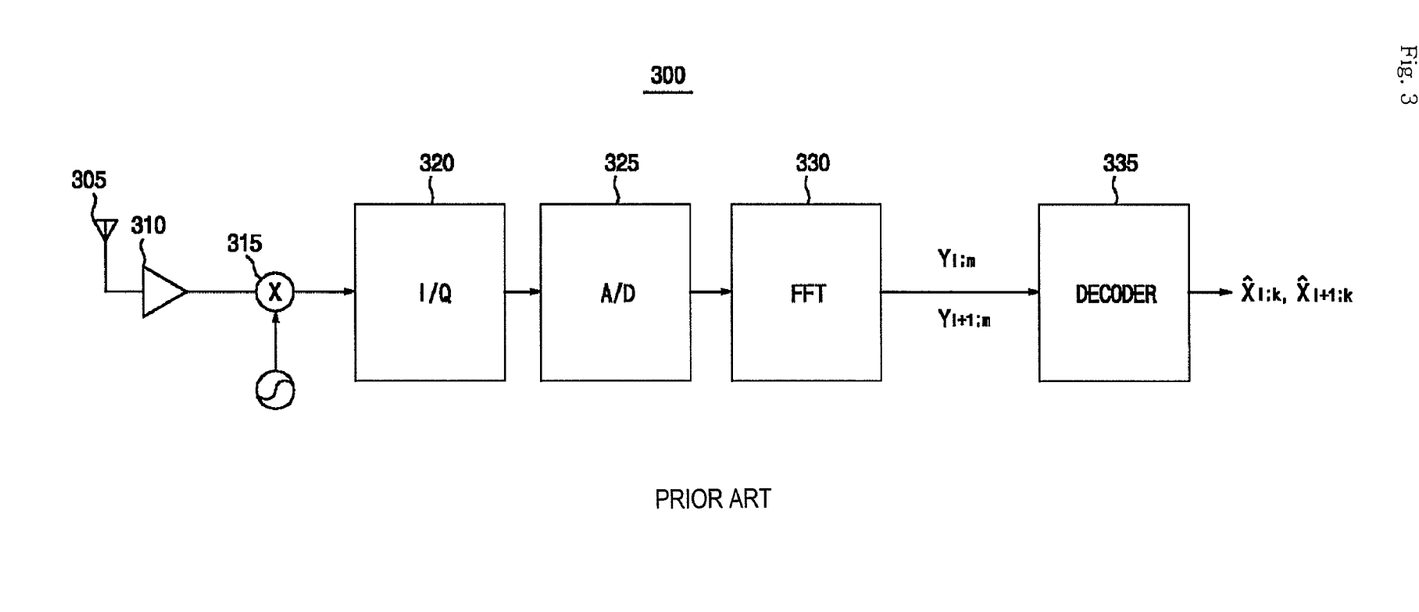
FIG. 3 is a schematic diagram of an STBC-OFDM receiver having one receive antenna.

FIG. 3 is the schematic construction of an STBC-OFDM receiver 300 in the case where two transmit antennas and one receive antenna are used.

As shown in FIG. 3, an OFDM signal transmitted from an STBC-OFDM transmitter is received by a receive antenna 305, and is then input to an FFT 330 through an amplifier 310, a down converter 315, an I/Q demodulator 320 and an A/D converter 325.

The FFT 330 demodulates a digital signal output from an A/D converter 325 into a demodulated OFDM symbol $Y_{l;m}$ where m represents a sub-channel. Meanwhile, in the case where a receive diversity gain is provided by a plurality of receive antennas 305 and 305', a linear combiner that combines demodulated OFDM symbols that are demodulated by a plurality of the FFTs corresponding to each of the antennas can be added. A decoder 335 then determines transmit data symbols by processing the demodulated OFDM symbol.

For example, in the case where one receive antenna is used, as shown in FIG. 3, if a CP is longer than the period of the maximum delay spread of a wireless channel and perfect synchronization is achieved at the receiver 300, $Y_l$ can be expressed as the following Equation 4 for N sub-channels.

$$Y_l = [Y_{l;0}, Y_{l;1} \ldots, Y_{l;N-1}]^T = \sum_{i=1}^{2} H_l^i S_l^i + W_l \quad (4)$$

where $W_l$ is Additive White Gaussian Noise (AWGN) having a size of N×1, its average is 0, and its distribution is $\sigma_w^2$. $H_l^i$ represents frequency response or transfer gain for the ith transmit antenna in the 1th symbol period. More detailed information is disclosed in "An Equalization Technique for OFDM Systems in Time-variant Multipath Channels," W. G. Jeon, K. H. Chang, and Y. S. Cho, *IEEE Trans. Commun.*, Vol. 47, No. 1, pp. 27-32, January, 1999; hereinafter referred to as "Reference 4").

Meanwhile, the OFDM reception symbols $Y_l$ based on Equation 4 are expressed for an mth (m∈[0, 1, . . . , N−1]) sub-carrier as follows:

$$Y_{l;m} = H_{l;m} S_{l;m} + I_{l;m} + W_{l;m}$$

$$H_{l;m} = [H_{l;m}^1, H_{l;m}^2]$$

$$S_{l;m} = [S_{l;m}^1, S_{l;m}^2]^T$$

$$I_{l;m} = I_{l;m}^1 + I_{l;m}^2 \quad (5)$$

In that case, $I_{l;m}$ serves as ICI, as disclosed in Reference 4.

When the Maximum Likelihood (ML) technique is employed so as to detect transmit data symbols from the received OFDM symbol $Y_{l;m}$, optimal detection performance can be obtained. However, when the ML technique is applied as it is, problems arise in that complexity increases excessively and the amount of calculations increases exponentially in proportion to the degree of constellation of data symbols.

As an alternative for solving the above-described problems, the Alamouti technique, in which the ML method is simplified, may be used. When the number of transmit antennas is two or more, the Tarokh technique may be employed as disclosed in Reference 3. The above-described alternative method implements STBC decoding using simple linear calculation by assuming that there is no change in channel characteristics between two OFDM symbol periods, i.e., $H_{0;m}^i = H_{1;m}^i$.

For example, when STBC decoding is performed based on the Alamouti technique, Equation 6 is derived by simplifying calculation in such a way as to assume that $H_{0;m}^i = H_{1;m}^i$. Accordingly, decision variables $R_{0;m}$, $R_{1;m}$ for determining the transmit OFDM symbol signal are calculated.

$$\begin{bmatrix} R_{0;m} \\ R_{1;m} \end{bmatrix} = \begin{bmatrix} H_{0;m}^{1*} & H_{1;m}^2 \\ H_{0;m}^{2*} & -H_{1;m}^1 \end{bmatrix} \begin{bmatrix} Y_{0;m} \\ Y_{1;m}^* \end{bmatrix} \quad (6)$$

Subsequently, transmit data symbols are determined by applying a predetermined symbol decision rule to the decision variables $R_{0;m}$, $R_{1;m}$ calculated using Equation 6.

As described above, when the ML technique is applied to the detection of transmit data symbols in the conventional STBC-OFDM receiver (or STBC-OFDM signal detection device), a problem of excessive complexity arises. In order to solve this problem, decoding calculation is simplified by assuming that $H_{0;m}^i = H_{1;m}^i$.

However, in a time-variant channel environment in which a mobile terminal moves at high speed, there is a possibility that channel characteristics may vary between successive OFDM symbol periods because the degree of time-variation of a channel is high. Accordingly, when the conventional STBC-OFDM decoding technique is applied as it is in a time-variant channel environment, Co-Subchannel Interference (CSI) is generated due to the change in channel characteristics between successive OFDM symbols. That is, the influence of an error due to $e_m^i = H_{0;m}^i - H_{1;m}^i$ is included because it is assumed that $H_{0;m}^i = H_{1;m}^i$ in Equation 6. As such, the influence is called CSI because it results from an interference signal based on the same sub-carrier of different transmit antennas.

The generation of CSI results in increased noise power, which causes the probability of making a decision error to increase. In particular, CSI increases in proportion to the number of transmit antennas. Since the increase in diversity gain is not proportional to the increase in the number of transmit antennas, the diversity gain is cancelled by CSI in a high-speed time-variant channel even though the number of antennas is increased to more than two. Thus, the effect thereof may be insignificant.

In the meantime, when the frequency responses of the individual sub-channels of a time-variant channel are estimated for individual OFDM symbol periods and the ML technique is applied as it is, the complexity of calculation increases, which may lead to complicated system configuration.

SUMMARY OF THE INVENTION

Accordingly, the present invention has been made keeping in mind the above problems occurring in the prior art, and an object of the present invention is to provide a method and apparatus for detecting STBC-OFDM signals in time-variant channels, which can prevent detection errors due to CSI generated in time-variant channels and simplify system configuration by deriving a linear calculation equation used for detecting transmitted OFDM signals.

In order to accomplish the above object, a first aspect of the present invention provide a method of detecting transmit data symbols $X_{0;k}, \ldots, X_{A-1;k}$ in an STBC-OFDM communication system in which A transmit data symbols $X_{0;k}, \ldots, X_{A-1;k}$ are STBC encoded and OFDM modulated during B symbol periods for each sub-channel k (k=0, 1, ..., N−1) and are then transmitted through P (P>1) transmit antennas, including a step of demodulating STBC-OFDM modulation signals into OFDM reception symbols $Y_{0;m}, \ldots, Y_{B-1;m}$ using Fast Fourier Transform (FFT); a step of estimating frequency responses $H_{0;m}^{i}, \ldots, H_{B-1;m}^{i}$ (i=1, 2, ..., P) for each sub-channel; an STBC decoding step of calculating decision variables $R_{0;m}, \ldots R_{A-1;m}$ for determining the A transmit data symbols $X_{0;k}, \ldots, X_{A-1;k}$ that are transmitted during the B OFDM symbol periods for each sub-channel; and a step of determining the transmit data symbols $X_{0;k}, \ldots, X_{A-1;k}$ based on the decision variables $R_{0;m}, \ldots, R_{A-1;m}$ calculated at the STBC decoding step. The STBC decoding step calculates the decision variables $R_{0;m}, \ldots, R_{A-1;m}$ by a linear equation that allows a squared Euclidean distance $D_m$ from OFDM reception symbols $Y_{0;m}, \ldots Y_{B-1;m}$ to have a local minimum for each decision variable when the STBC encoding and the frequency responses $H_{0;m}^{i}, \ldots H_{B-1;m}^{i}$ are applied to the decision variables $R_{0;m}, \ldots, R_{A-1;m}$.

Preferably, the linear equation used at the STBC decoding step may be derived by simultaneous equations that allow values of the squared Euclidean distance $D_m$ partially differentiated by each of the decision variables $R_{0;m}, \ldots, R_{A-1;m}$ to be 0.

In accordance with a second aspect of the present invention, an STBC-OFDM signal detection apparatus having means for performing respective steps of the method according to the first aspect of the present invention is provided.

In accordance with a third aspect of the present invention, there is provided a method of detecting transmit data symbols $X_{0;k}, X_{1;k}$ in an STBC-OFDM wireless communication system in which the transmit data symbols $X_{0;k}, X_{1;k}$ are STBC encoded and OFDM modulated during two symbol periods for each sub-channel k(k=0, 1, ..., N−1) and then are transmitted through two transmit antennas 1 and 2, including a step of demodulating STBC-OFDM modulation signals into demodulated OFDM symbols $Y_{0;m}, Y_{1;m}$ using FFT; a step of estimating frequency responses $H_{0;m}^{1}, H_{0;m}^{2}, H_{1;m}^{1}, H_{1;m}^{2}$ for each sub-channel during the two symbol periods; an STBC decoding step of calculating decision variables $R_{0;m}, R_{1;m}$, for determining the data symbols $X_{0;k}, X_{1;k}$ that are transmitted during the two symbol periods for each sub-channel; and a step of determining the transmit data symbols $X_{0;k}, X_{1;m}$ based on the decision variables $R_{0;m}, R_{1;m}$ calculated at the STBC decoding step. The decision variables $R_{0;m}, R_{1;m}$ are calculated using $$\begin{bmatrix} R_{0;m} \\ R_{1;m} \end{bmatrix} = \begin{bmatrix} H_{0;m}^{1} & H_{0;m}^{2} \\ H_{1;m}^{2*} & -H_{1;m}^{1*} \end{bmatrix}^{-1} \begin{bmatrix} Y_{0;m} \\ Y_{1;m}^{*} \end{bmatrix}$$

based on the demodulated OFDM symbols $Y_{0;m}, Y_{1;m}$ and the estimated frequency responses $H_{0;m}^{1}, H_{0;m}^{2}, H_{1;m}^{1}, H_{1;m}^{2}$.

Finally, in accordance with a fourth aspect of the present invention, there is provided an STBC-OFDM signal detection apparatus having means for performing respective steps of the method according to the third aspect of the present invention.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components.

Figure 4:
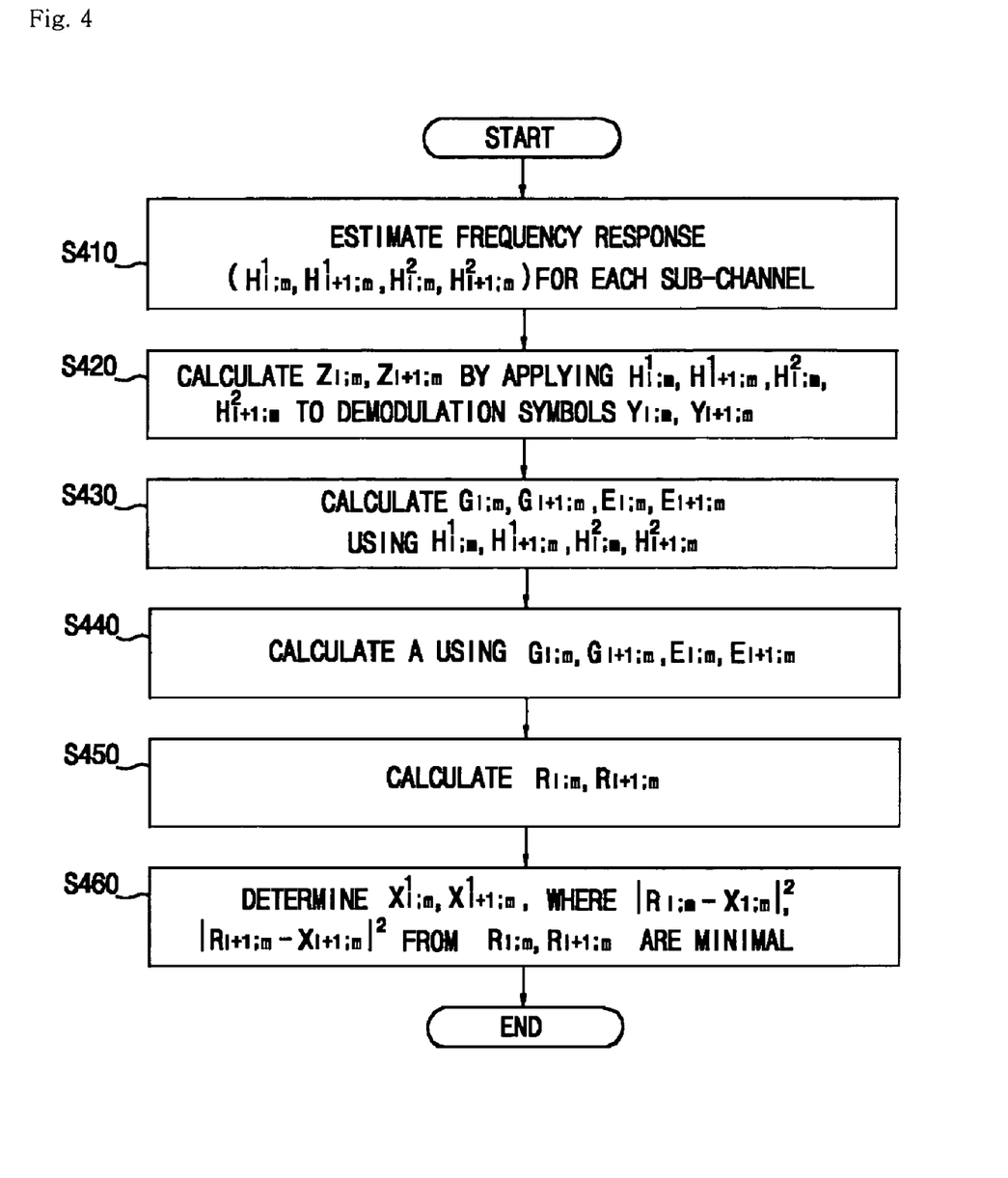
FIG. 4 is a flowchart illustrating an STBC-OFDM signal detection process according to an embodiment of the present invention.

FIG. 4 is a flowchart illustrating a method for detecting data symbols, which are STBC-OFDM modulated and are then transmitted using two transmit antennas, in accordance with an embodiment of the present invention. Meanwhile, methods or means for receiving an STBC-OFDM modulation signal through an STBC-OFDM receiver and demodulating the STBC-OFDM modulation signal into a demodulated OFDM symbol vector $Y_m = [Y_{0;m}, Y_{1;m}]^T$ using FFT have been described with reference to FIG. 3, or are known to those skilled in the art. Accordingly, the step of determining the transmit data symbol based on the OFDM reception symbol $Y_m = [Y_{0;m}, Y_{1;m}]^T$ is described in detail below.

At step S410, the frequency response H of each sub-channel m via which an STBC-OFDM modulation signal is transmitted is estimated as expressed in the following Equation 7.

At this time, it should be noted that frequency responses must be estimated for individual symbol periods so as to consider the variation in frequency response due to a time-variant channel.

$$H_m = \begin{bmatrix} H_{0;m}^1 & H_{0;m}^2 \\ H_{1;m}^1 & -H_{1;m}^2 \end{bmatrix} \quad (7)$$

where the first and second rows of the matrix $H_m$ represent the frequency responses for the individual symbol-periods. The first and second columns of the matrix $H_m$ represent frequency responses for individual antennas 1 and 2.

A method of estimating frequency responses of individual sub-channels may be classified into Pilot Symbol-Aided (PSA) estimation and Decision-Directed (DD) estimation depending upon the type of data used in channel estimation. The PSA estimation is suitable for a high-speed fading channel. The DD estimation is suitable for a fixed fading channel or a low-speed fading channel having high time correlation because the method estimates a channel in a subsequent symbol period using detected data.

At steps S420 to S450, decision variables $R_{0;m}$, $R_{1;m}$ for determining data symbols transmitted during two OFDM symbol periods are calculated based on the demodulated OFDM symbols $Y_{0;m}$, $Y_{1;m}$ demodulated during the two OFDM symbol periods and the frequency responses $H_m$ estimated for the two OFDM symbol periods at step S410. The principle for deriving an equation for calculating the decision variables $R_{0;m}$, $R_{1;m}$ is described below.

In the case where the STBC encoding and the frequency responses, estimated at step S410, are applied to the decision variables $R_{0;m}$, $R_{1;m}$, a squared Euclidean distance $D_m$ from the demodulated OFDM symbols $Y_{0;m}$, $Y_{1;m}$ that are actually demodulated at the receiving end can be expressed as the following Equation 8.

$$D_m = |Y_{0;m} - H_{0;m}^1 X_{0;m} - H_{0;m}^2 X_{1;m}|^2 + |Y_{1;m} + H_{1;m}^1 X_{1;m}^* - H_{1;m}^2 X_{0;m}^*|^2 \quad (8)$$

The transmit data symbol $X_m = [X_{0;m}, X_{1;m}]^T$ that allows the squared Euclidean distance $D_m$ according to Equation 8 to have a local minimum can be expressed as the following Equation 9.

$$X_m = \min_{\{X_{0;m}, X_{1;m}\}} D_m \quad (9)$$

In a preferred embodiment of the present invention, the unknown transmit data symbol $X_m = [X_{0;m}, X_{1;m}]^T$ that fulfills Equation 9 is not calculated according to the conventional ML technique. Instead, the squared Euclidean distance $D_m$ according to Equation 8 is partially differentiated independently for individual transmit data symbols, and the values of $X_{0;m}$ and $X_{1;m}$ that cause the partial differentiation results to become zero are calculated, which is represented by the following Equations 10 to 14. Accordingly, the values of $X_{0;m}$ and $X_{1;m}$, which are calculated using Equations 10 to 14, are values that allow the squared Euclidean distance $D_m$ to have a local minimum for each transmit data symbol, and are calculated independently. In other words, the values of $X_{0;m}$ and $X_{1;m}$, which are calculated using Equations 10 to 14, are values that allow the squared Euclidean distance $D_m$ to have a local minimum for each transmit data symbol.

$$\frac{\partial D_m}{\partial X_{0;m}} = -Z_{0;m}^* + X_{0;m}^* G_{0;m} + X_{1;m}^* E_{0;m}^* = 0 \quad (10)$$

$$\frac{\partial D_m}{\partial X_{1;m}} = -Z_{1;m}^* + X_{1;m}^* G_{1;m} + X_{1;m}^* E_{1;m}^* = 0 \quad (11)$$

The channel coefficients $G_{l;m}$, $E_{l;m}$, and $Z_{l;m}$, which are used in Equations 10 and 11, can be calculated in advance, as defined in Equations 12 to 14.

$$G_{0;m} = |H_{0;m}^1|^2 + |H_{1;m}^2|^2, G_{1;m} = |H_{1;m}^1|^2 + |H_{0;m}^2|^2, E_{0;m} = E_{1;m}^* = H_{0;m}^1 * H_{0;m}^2 - H_{1;m}^1 * H_{1;m}^2 \quad (12)$$

$$Z_{0;m} = H_{0;m}^1 * Y_{0;m} + H_{1;m}^2 Y_{1;m}^* \quad (13)$$

$$Z_{1;m} = H_{0;m}^2 * Y_{0;m} - H_{1;m}^1 Y_{1;m}^* \quad (14)$$

Since Equations 10 and 11 are two linear equations with two variables, solutions can be obtained by performing linear calculation on the demodulated OFDM symbols $Y_{0;m}$, $Y_{1;m}$. Accordingly, a matrix equation can be defined as the following Equation 15 based on Equations 10 and 11.

$$Z_m = [Z_{0;m}, Z_{1;m}]^T = G_m X_m, \; G_m = \begin{bmatrix} G_{0;m} & E_{0;m} \\ E_{1;m} & G_{1;m} \end{bmatrix} \quad (15)$$

The value of $X_m$, which is obtained by multiplying both sides of Equation 15 by $G_m^{-1}$, is a decision variable $R_m$ for determining the transmit data symbol. It can be understood that the decision variable $R_m$ can be calculated using the linear equation for $Y_{0;m}$, $Y_{1;m}$ as in Equation 16.

$$R_{0;m} = \frac{1}{A}[G_{1;m} Z_{0;m} - E_{1;m} Z_{1;m}], \quad (16)$$

$$R_{1;m} = \frac{1}{A}[-E_{0;m} Z_{0;m} + G_{0;m} Z_{1;m}]$$

where $A = G_{0;m} G_{1;m} - E_{0;m} E_{1;m}$.

As described above, it can be understood that the decision variable calculated using Equation 16 allows the squared Euclidean distance $D_m$ to have a local minimum for each decision variable according to Equations 10 and 11, and is derived without the assumption that $H_{0;m}^i = H_{1;m}^i$. If a certain symbol decision rule is applied to the decision variables, the transmit data symbols can be determined.

With reference to FIG. 4 again, the steps of determining transmit data symbols based on the above-described principle are described below.

At step S420, $Z_m(=[Z_{0;m}, Z_{1;m}]^T)$ is calculated by combining $Y_{0;m}$, $Y_{1;m}$, which are demodulated using FFT during two symbol periods, with the frequency responses $H_{0;m}^1$, $H_{1;m}^1$, $H_{0;m}^2$, $H_{1;m}^2$, which are estimated at step S410, according to Equations 13 and 14.

Thereafter, at step S430, a matrix $G_m$ of channel coefficients is calculated according to Equation 15 based on the frequency responses $H_{0;m}^1$, $H_{1;m}^1$, $H_{0;m}^2$, $H_{1;m}^2$ that are estimated at step S410. At step S440, the determinant A of the matrix $G_m$ of the channel coefficients, which is calculated at step S430, is calculated.

At step S450, decision variables $R_{0;m}$, $R_{1;m}$ are calculated by performing matrix multiplication on the inverse matrix $G_m^{-1}$ of the channel coefficients and $Z_m$ calculated at step S420. For example, in the case of performing STBC encoding using two transmit antennas, the calculation equation of the above-described decision variables $R_{0;m}$, $R_{1;m}$ is the same as the above-described Equation 16.

Finally, at step S460, the data symbols $X_{0;m}$, $X_{1;m}$, which are actually transmitted by the transmitter, are determined based on the decision variables $R_{0;m}$, $R_{1;m}$ in accordance with the symbol decision rule. As one of the symbol decision rules, the symbols $X_{0;m}$, $X_{1;m}$ that satisfy Equation 17 in the M-ary constellation of the data symbols previously defined in the OFDM communication system may be determined as the transmitted data symbols.

$$X_{l;m} = \min_{X_{l;m}} |R_{l;m} - X_{l;m}|^2, \quad = X_{l+1;m} = \min_{X_{l+1;m}} |R_{l+1;m} - X_{l+1;m}|^2 \quad (17)$$

According to Equation 17, a data symbol having a minimum distance from the decision variable of each period is selected. Accordingly, the transmit data symbols can be independently determined.

Figure 5:
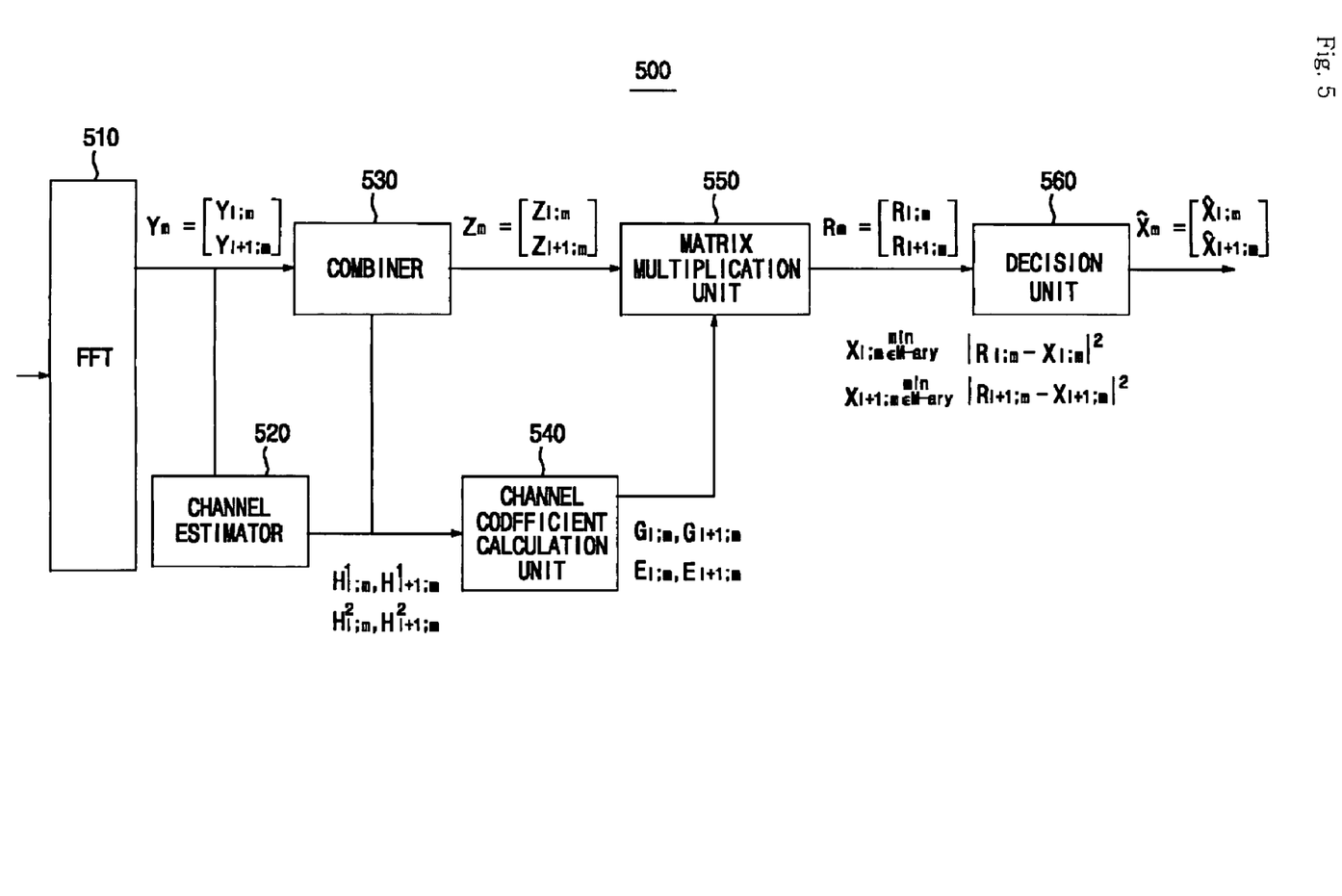
FIG. 5 is a block diagram illustrating the construction of an STBC-OFDM signal detector according to an embodiment of the present invention.

FIG. 5 is a block diagram illustrating the construction of an STBC-OFDM signal detector in which the above-described STBC-OFDM signal detection method is implemented in hardware form.

As shown in FIG. 5, a channel estimator 520, a combiner 530 and a channel coefficient calculation unit 540 perform steps S410, S420 and S430 of FIG. 4, respectively. A matrix multiplication unit 550 performs steps S440 and 450 of FIG. 4. Further, the decision unit 560 performs step S460 of FIG. 5. Accordingly, the operation of each of the components of FIG. 5 can be sufficiently understood from the description of FIG. 4.

According to another aspect of the present invention, in the case where the number of transmit antennas is two, and the number of reception antennas is one, the estimation value of the transmit data symbol $X_m$ can be calculated using the Zero-Forcing (ZF) technique.

In order to apply the ZF technique, the OFDM reception symbol $Y_m$ demodulated using FFT can be defined as the following Equation 18.

$$Y_m = G_m X_m + I_m + W_m \quad (18)$$

where $Y_m = [Y_{0;m}, Y_{1;m}^*]^T$, $I_m = [I_{0;m} I_{1;m}^*]^T$, $W_m = [W_{0;m}, W_{1;m}^*]^T$ and $G_m$ are as follows.

$$G_m = \begin{bmatrix} H_{0;m}^1 & H_{0;m}^2 \\ H_{1;m}^{2*} & -H_{1;m}^{1*} \end{bmatrix} \quad (19)$$

As described above, when the Alamouti technique is applied, calculation can be simplified by assuming that $H_{0;m}^i = H_{1;m}^i$ in Equation 6, but a problem arises in that CSI is generated. In order to solve this problem, according to another aspect of the present invention, the estimation value of $X_m$ is calculated by multiplying both sides of Equation 18 by the inverse matrix $G_m^{-1}$ of $G_m$ instead of applying the Alamouti technique. In this case, $G_m^{-1}(I_m + W_m)$ is approximated to 0 using the ZF technique. Accordingly, the estimation value of $X_m$ can be expressed as the following Equation 20.

$$X_m = G_m^{-1} Y_m \quad (20)$$

The equation 20 can be expanded to the following Equation 21.

$$X_{0;m} = \frac{1}{A}[H_{1;m}^{1*} Y_{0;m} + H_{0;m}^2 Y_{1;m}^*], \quad (21)$$

$$X_{1;m} = \frac{1}{A}[H_{1;m}^{2*} Y_{0;m} - H_{0;m}^1 Y_{1;m}^*]$$

Finally, when the above-described symbol decision rule is applied to the estimation value of $X_m$, which is calculated from Equation 21, used as a decision variable, the transmit data symbols can be determined.

As described above, in accordance with the present invention, when detecting transmit data symbols from an STBC-OFDM signal in a time-variant channel, the frequency response for each OFDM sub-channel is estimated for each OFDM symbol period, and is STBC decoded, so that detection errors due to CSI generated in the time-variant channel can be prevented.

Furthermore, calculation for decoding the STBC-OFDM signal is linearly performed. Accordingly, although the amount of data required for calculation considering CSI is increased, a signal detection apparatus can be implemented in simple form. Moreover, it is possible to prevent the amount of calculations from exponentially increasing due to an increase in the degree of constellation of OFDM data symbols, compared to the prior art.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of detecting transmit data symbols $X_{0;m}, \ldots, X_{A-1;m}$ in an STBC-OFDM communication system in which A transmit data symbols $X_{0;m}, \ldots, X_{A-1;m}$ are STBC encoded and OFDM modulated during B OFDM symbol periods for each sub-channel m (m=0, 1, . . . , N−1) and are then transmitted through P (P>1) transmit antennas, comprising:

a step of demodulating STBC-OFDM modulation signals into $Y_{0;m}, \ldots, Y_{B-1;m}$ using FFT;

a step of estimating frequency responses $H_{0;m}^i, \ldots, H_{B-1;m}^i$ (i=1, 2, . . . , P) for each sub-channel;

an STBC decoding step of calculating decision variables $R_{0;m}, \ldots, R_{A-1;m}$ for determining the transmit data symbols $X_{0;m}, \ldots, X_{A-1;m}$ that are transmitted for each sub-channel; and a step of determining the transmit data symbols $X_{0;m}, \ldots, X_{A-1;m}$ based on the decision variables $R_{0;m}, \ldots, R_{A-1;m}$ calculated at the STBC decoding step;

wherein the STBC decoding step calculating the decision variables $R_{0;m}, \ldots, R_{A-1;m}$ by a linear equation that allows a squared Euclidean distance $D_m$ from OFDM reception symbols $Y_{0;m}, \ldots, Y_{B-1;m}$ to have a local minimum for each decision variable when the STBC encoding and the frequency responses $H_{0;m}^i, \ldots, H_{B-1;m}^i$ are applied to the decision variables $R_{0;m}, \ldots, R_{A-1;m}$.

2. The method as set forth in claim 1, wherein the linear equation used at the STBC decoding step is derived by simultaneous equations that allow values of the squared Euclidean distance $D_m$ partially differentiated by each of the decision variables $R_{0;m}, \ldots, R_{A-1;m}$ to be 0.

3. The method as set forth in claim 2, wherein the linear equation used at the STBC decoding step, in case of A=2, is as follows:

$$R_{0;m} = \frac{1}{(G_{0;m}G_{1;m} - E_{0;m}E_{1;m})}[G_{1;m}Z_{0;m} - E_{1;m}Z_{1;m}],$$

$$R_{1;m} = \frac{1}{(G_{0;m}G_{1;m} - E_{0;m}E_{1;m})}[-E_{0;m}Z_{0;m} + G_{0;m}Z_{1;m}], \text{ where}$$

$$G_{0;m} = |H_{0;m}^1|^2 + |H_{1;m}^2|^2, \, G_{1;m} = |H_{1;m}^1|^2 + |H_{0;m}^2|^2,$$

$$E_{0;m} = E_{1;m}^* = H_{0;m}^{1*}H_{0;m}^2 - H_{1;m}^{1*}H_{1;m}^2,$$

$$Z_{0;m} = H_{0;m}^{1*}Y_{0;m} + H_{1;m}^2 Y_{1;m}^*, \, Z_{1;m} = H_{0;m}^{2*}Y_{0;m} - H_{1;m}^1 Y_{1;m}^*.$$

4. A method of detecting transmit data symbols $X_{0;m}$, $X_{1;m}$ in a STBC-OFDM communication system in which the transmit data symbols $X_{0;m}$, $X_{1;m}$ are STBC encoded and OFDM modulated during two symbol periods for each sub-channel m (m=0, 1, ..., N−1) and are then transmitted through two transmit antennas 1 and 2, comprising:
- a step of demodulating STBC-OFDM modulation signals into OFDM reception symbols $Y_{0;m}$, $Y_{1;m}$ using FFT;
- a step of estimating frequency responses $H_{0;m}^1$, $H_{0;m}^2$, $H_{1;m}^1$, $H_{1;m}^2$ for each sub-channel during the two symbol periods;
- an STBC decoding step of calculating decision variables $R_{0;m}$, $R_{1;m}$ for determining the data symbols $X_{0;m}$, $X_{1;m}$ that are transmitted during the two symbol periods for each sub-channel; and
- a step of determining the transmit data symbols $X_{0;m}$, $X_{1;m}$ based on the decision variables $R_{0;m}$, $R_{1;m}$ calculated at the STBC decoding step;

wherein the decision variables $R_{0;m}$, $R_{1;m}$ are calculated using $$\begin{bmatrix} R_{0;m} \\ R_{1;m} \end{bmatrix} = \begin{bmatrix} H_{0;m}^1 & H_{0;m}^2 \\ H_{1;m}^{2*} & -H_{1;m}^{1*} \end{bmatrix}^{-1} \begin{bmatrix} Y_{0;m} \\ Y_{1;m}^* \end{bmatrix}$$

based on $Y_{0;m}$, $Y_{1;m}$ and the frequency responses $H_{0;m}^1$, $H_{0;m}^2$, $H_{1;m}^1$, $H_{1;m}^2$.

5. The method as set forth in claim 4, wherein the determination step is performed in such a way as to determine the symbols $X_{l;m}$ (l=0, 1), which fulfill $X_{l;m} = \min_{X_{l;m}} |R_{l;m} - X_{l;m}|^2$, to be the transmit data symbols for individual symbol periods.

6. An apparatus for detecting transmit data symbols $X_{0;m}, \ldots, X_{A-1;m}$ in an STBC-OFDM communication system in which A transmit data symbols $X_{0;m}, \ldots, X_{A-1;m}$ are STBC encoded and OFDM modulated during B symbol periods for each sub-channel m (m=0, 1, ..., N−1) and are then transmitted through P (P>1) transmit antennas, comprising:
- means for demodulating STBC-OFDM modulation signals into OFDM reception symbols $Y_{0;m}, \ldots, Y_{B-1;m}$ using FFT;
- means for estimating frequency responses $H_{0;m}^i, \ldots, H_{B-1;m}^i$ (i=1, 2, ..., P) for each sub-channel;
- STBC decoding means for calculating decision variables $R_{0;m}, \ldots, R_{A-1;m}$ for determining the transmit data symbols $X_{0;m}, \ldots, X_{A-1;m}$ that are transmitted during the B symbol periods for each sub-channel; and
- means for determining the transmit data symbols $X_{0;m}, \ldots, X_{A-1;m}$ based on the decision variables $R_{0;m}, \ldots, R_{A-1;m}$ calculated by the STBC decoding means;

wherein the STBC decoding means calculating the decision variables $R_{0;m}, \ldots, R_{A-1;m}$ by a linear equation that allows a squared Euclidean distance $D_m$ from OFDM reception symbols $Y_{0;m}, \ldots, Y_{B-1;m}$ to have a local minimum for each decision variable when the STBC encoding and the frequency responses $H_{0;m}^i, \ldots, H_{B-1;m}^i$ are applied to the decision variables $R_{0;m}, \ldots, R_{A-1;m}$.

7. The apparatus as set forth in claim 6, wherein the decision means determines symbols $X_{1;m}$, which fulfill $$X_{l;m} = \min_{X_{l;m}} |R_{l;m} - X_{l;m}|^2,$$

to be the transmit data symbols for individual symbol periods.

8. The apparatus as set forth in claim 6, wherein the linear equation used by the STBC decoding means is derived by simultaneous equations that allow values of the squared Euclidean distance $D_m$ partially differentiated by each of the decision variables $R_{0;m}, \ldots, R_{A-1;m}$ to be 0.

9. The apparatus as set forth in claim 8, wherein the linear equation used at the STBC decoding means, in case of A=2, is as follows:

$$R_{0;m} = \frac{1}{(G_{0;m}G_{1;m} - E_{0;m}E_{1;m})}[G_{1;m}Z_{0;m} - E_{1;m}Z_{1;m}],$$

$$R_{1;m} = \frac{1}{(G_{0;m}G_{1;m} - E_{0;m}E_{1;m})}[-E_{0;m}Z_{0;m} + G_{0;m}Z_{1;m}], \text{ where}$$

$$G_{0;m} = |H_{0;m}^1|^2 + |H_{1;m}^2|^2, \, G_{1;m} = |H_{1;m}^1|^2 + |H_{0;m}^2|^2,$$

$$E_{0;m} = E_{1;m}^* = H_{0;m}^{1*}H_{0;m}^2 - H_{1;m}^{1*}H_{1;m}^2,$$

$$Z_{0;m} = H_{0;m}^{1*}Y_{0;m} + H_{1;m}^2 Y_{1;m}^*, \, Z_{1;m} = H_{0;m}^{2*}Y_{0;m} - H_{1;m}^1 Y_{1;m}^*.$$

10. An apparatus for detecting transmit data symbols $X_{0;m}$, $X_{1;m}$ in an STBC-OFDM wireless communication system in which the transmit data symbols $X_{0;m}$, $X_{1;m}$ are STBC encoded and OFDM modulated during two symbol periods for each sub-channel m (m=0, 1, ..., N−1) and are then transmitted through two transmit antennas 1 and 2, comprising:
- means for demodulating STBC-OFDM modulation signals into $Y_{0;m}$, $Y_{1;m}$ using FFT;
- means for estimating frequency responses $H_{0;m}^1$, $H_{0;m}^2$, $H_{1;m}^1$, $H_{1;m}^2$ for each sub-channel during the two symbol periods;
- STBC decoding means for calculating decision variables $R_{0;m}$, $R_{1;m}$ for determining the data symbols $X_{0;m}$, $X_{1;m}$ that are transmitted during the two OFDM symbol periods for each sub-channel; and
- means for determining the transmit data symbols $X_{0;m}$, $X_{1;m}$ based on the decision variables $R_{0;m}$, $R_{1;m}$ calculated by the STBC decoding means;

wherein the decision variables $R_{0;m}$, $R_{1;m}$ are calculated using $$\begin{bmatrix} R_{0;m} \\ R_{1;m} \end{bmatrix} = \begin{bmatrix} H_{0;m}^1 & H_{0;m}^2 \\ H_{1;m}^{2*} & -H_{1;m}^{1*} \end{bmatrix}^{-1} \begin{bmatrix} Y_{0;m} \\ Y_{1;m}^* \end{bmatrix}$$

based on $Y_{0;m}$, $Y_{1;m}$ and the frequency responses $H_{0;m}^1$, $H_{0;m}^2$, $H_{1;m}^1$, $H_{1;m}^2$.

11. The apparatus as set forth in claim 10, wherein the decision means determines symbols $X_{l;m}$ (l=0, 1), which fulfill $$X_{l;m} = \min_{X_{l;m}} |R_{l;m} - X_{l;m}|^2,$$

to be the transmit data symbols for individual symbol periods.

12. A STBC-OFDM receiving apparatus for detecting transmit data symbols $X_{0;m}, \ldots, X_{A-1;m}$ in an STBC-OFDM communication system in which transmit data symbols $X_{0;m}, \ldots, X_{A-1;m}$ are STBC encoded and OFDM modulated during B OFDM symbol periods for each sub-channel m (m=0, 1, ..., N−1) and are then transmitted through P (P>1) transmit antennas, comprising:
 one or more receive antennas for receiving STBC-OFDM modulation signals;
 down-conversion means for down-converting the STBC-OFDM modulation signals received from the reception antennas;
 Analog-Digital (A/D) conversion means for converting the signal, which is output from the down-conversion means, into a digital signal;
 means for demodulating the digital signal, which is output from the A/D conversion means, into $Y_{0;m}, \ldots, Y_{B-1;m}$ using FFT;
 means for estimating a frequency response $H_{0;m}^i, \ldots, H_{B-1;m}^i$ (i=1, 2, ..., P) for each sub-channel;
 STBC decoding means for calculating decision variables $R_{0;m}, \ldots, R_{A-1;m}$ for determining the transmit data symbols $X_{0;m}, \ldots, X_{A-1;m}$ that are transmitted during the B OFDM symbol periods for each sub-channel; and
 means for determining the transmit data symbols $X_{0;m}, \ldots, X_{A-1;m}$ based on the decision variables $R_{0;m}, \ldots, R_{A-1;m}$ calculated by the STBC decoding means;
 wherein the STBC decoding means calculating the decision variables $R_{0;m}, \ldots, R_{A-1;m}$ by a linear equation that allows a squared Euclidean distance $D_m$ from OFDM reception symbols $Y_{0;m}, \ldots, Y_{B-1;m}$ to have a local minimum for each decision variable when the STBC encoding and the frequency responses $H_{0;m}^i, \ldots, H_{B-1;m}^i$ are applied to the decision variables $R_{0;m}, \ldots, R_{A-1;m}$.

13. The STBC-OFDM receiving apparatus as set forth in claim 12, wherein the decision means determines symbols $X_{l;m}$ which fulfill $$X_{l;m} = \min_{X_{l;m}} |R_{l;m} - X_{l;m}|^2,$$

to be the transmitted OFDM symbol signals for individual symbol periods.

14. The STBC-OFDM receiving apparatus as set forth in claim 12, wherein the linear equation used by the STBC decoding means is derived by simultaneous equations that allow values of the squared Euclidean distance $D_m$ partially differentiated by each of the decision variables $R_{0;m}, \ldots, R_{A-1;m}$ to be 0.

15. The method as set forth in claim 14, wherein the linear equation used at the STBC decoding means, in case of A=2, is as follows:

$$R_{0;m} = \frac{1}{(G_{0;m}G_{1;m} - E_{0;m}E_{1;m})}[G_{1;m}Z_{0;m} - E_{1;m}Z_{1;m}],$$

$$R_{1;m} = \frac{1}{(G_{0;m}G_{1;m} - E_{0;m}E_{1;m})}[-E_{0;m}Z_{0;m} + G_{0;m}Z_{1;m}], \text{ where}$$

$$G_{0;m} = |H_{0;m}^1|^2 + |H_{1;m}^2|^2,\ G_{1;m} = |H_{1;m}^1|^2 + |H_{0;m}^2|^2,$$

$$E_{0;m} = E_{1;m}^* = H_{0;m}^{1*}H_{0;m}^2 - H_{1;m}^{1*}H_{1;m}^2,$$

$$Z_{0;m} = H_{0;m}^{1*}Y_{0;m} + H_{1;m}^2 Y_{1;m}^*,\ Z_{1;m} = H_{0;m}^{2*}Y_{0;m} - H_{1;m}^1 Y_{1;m}^*.$$

16. A STBC-OFDM receiving apparatus for detecting transmit data symbols $X_{0;m}, X_{1;m}$ in an STBC-OFDM communication method in which the transmit data symbols $X_{0;m}, X_{1;m}$ are STBC encoded and OFDM modulated during two OFDM symbol periods for each sub-channel m (m=0, 1, ..., N−1) and are then transmitted through two transmit antennas 1 and 2, comprising:
 one receive antenna for receiving an STBC-OFDM modulation signal;
 down-conversion means for down-converting the STBC-OFDM modulation signal received from the reception antenna;
 A/D conversion means for converting the signal, which is output from the down-conversion means, into a digital signal;
 means for demodulating the STBC-OFDM modulation signal into $Y_{0;m}, Y_{1;m}$ using FFT;
 means for estimating frequency responses $H_{0;m}^1, H_{0;m}^2, H_{1;m}^1, H_{1;m}^2$ for each sub-channel during the two OFDM symbol periods;
 STBC decoding means for calculating decision variables $R_{0;m}, R_{1;m}$ for determining the data symbols $X_{0;m}, X_{1;m}$ that are transmitted during the two OFDM symbol periods for each sub-channel; and
 means for determining the transmit data symbols $X_{0;m}, X_{1;m}$ based on the decision variables $R_{0;m}, R_{1;m}$ calculated by the STBC decoding means;
 wherein the decision variables $R_{0;m}, R_{1;m}$ are calculated using $$\begin{bmatrix} R_{0;m} \\ R_{1;m} \end{bmatrix} = \begin{bmatrix} H_{0;m}^1 & H_{0;m}^2 \\ H_{1;m}^{2*} & -H_{1;m}^{1*} \end{bmatrix}^{-1} \begin{bmatrix} Y_{0;m} \\ Y_{1;m}^* \end{bmatrix}$$

based on $Y_{0;m}, Y_{1;m}$ and the frequency responses $H_{0;m}^1, H_{0;m}^2, H_{1;m}^1, H_{1;m}^2$.

17. The STBC-OFDM receiving apparatus as set forth in claim 16, wherein the decision means determines symbols $X_{l;m}$ (l=0, 1), which fulfill $$X_{l;m} = \min_{X_{l;m}} |R_{l;m} - X_{l;m}|^2,$$

to be the transmit data symbols for individual symbol period.

* * * * *